Nov. 14, 1944.   J. A. MARKSTRUM   2,362,708
CUTTER
Filed June 29, 1942

INVENTOR
John A. Markstrum
BY Packer, Carlson, Pitzner & Hubbard
ATTORNEYS

Patented Nov. 14, 1944

2,362,708

UNITED STATES PATENT OFFICE 2,362,708

CUTTER

John A. Markstrum, Detroit, Mich., assignor to Ex-Cell-O Corporation, Detroit, Mich., a corporation of Michigan Application June 29, 1942, Serial No. 448,929

3 Claims. (Cl. 29—105)

This invention relates to the construction of tools for performing operations such as hollow milling and trepanning to form arcuate or cylindrical surfaces on the interior or exterior of a work piece.

One object is to provide an inserted blade cutter of the above character in which the blades are mounted in a novel manner to facilitate adjustment of blade edges to the desired work diameters.

A more detailed object is to provide a cutter of the above character in which a plurality of separately formed and sharpened blades are mounted in the cutter body for angular adjustment about their individual axes and with these axes disposed parallel to but eccentrically of the rotational axis of the cutter.

Other objects and advantages of the invention will become apparent from the following detailed description taken in connection with the accompanying drawing, in which Figure 1 is a diametrical cross section view of the improved cutter and part of a work piece.

Figure 1:
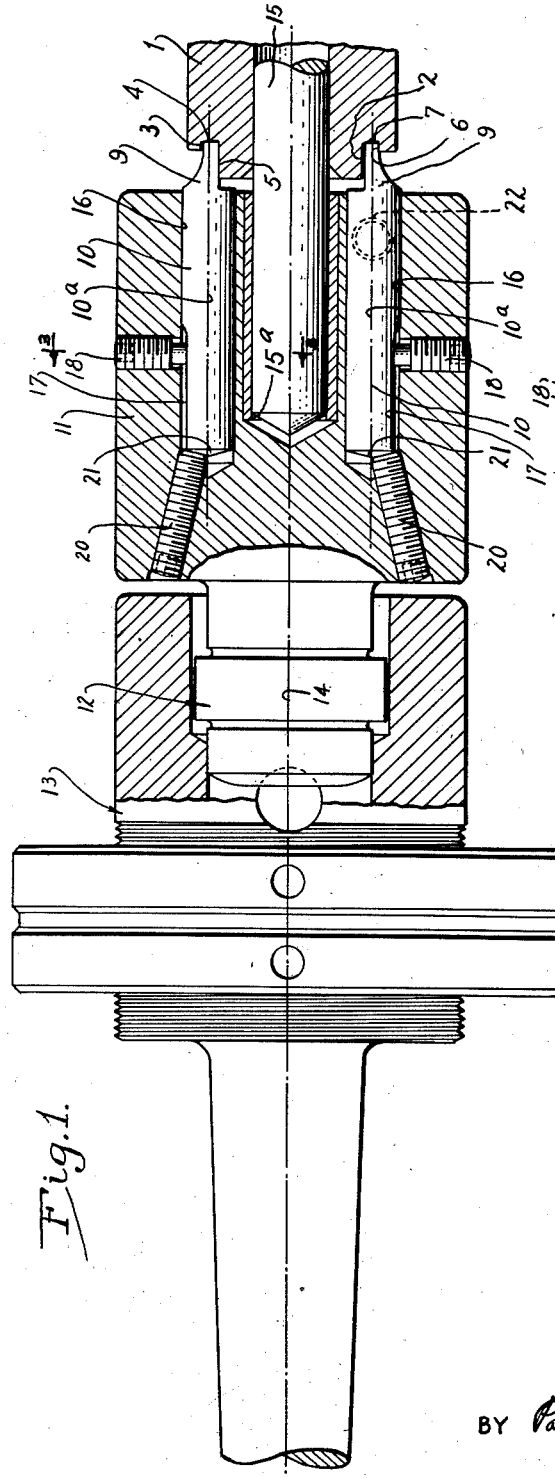
Figure 2:
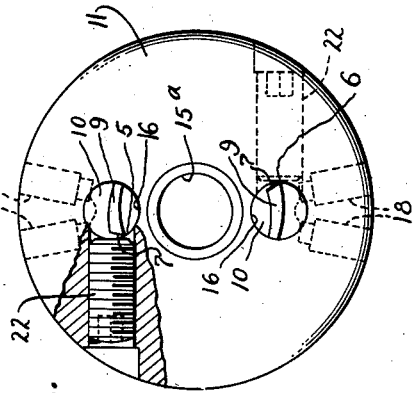
Fig. 2 is an end view partially broken away to show one of the lock screws.
Figure 3:
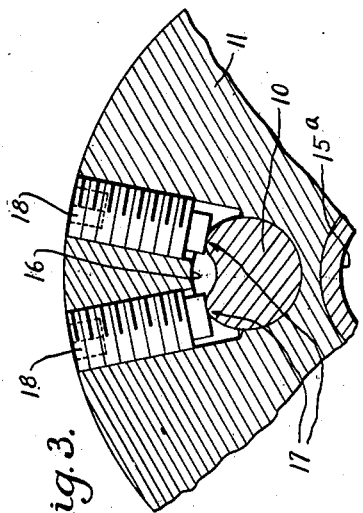
Fig. 3 is a section taken along the line 3—3 of Fig. 1.

While the invention is susceptible of various modifications and alternative constructions, I have shown in the drawing and will herein describe in detail the preferred embodiment. It is to be understood, however, that I do not intend to limit the invention by such disclosure but aim to cover all modifications and alternative constructions falling within the spirit and scope of the invention as expressed in the appended claims.

The cutter shown in the drawing is adapted to perform a series of milling operations on a work piece 1 to form an annular end groove having an external surface 2, an internal surface 3, and a bottom 4. These surfaces are milled by side cutting edges 5 and 6 and end cutting edges 7 on the ends 9 of blades 10 which are mounted in a body 11 with the blade ends projecting from one end thereof. At its opposite end, the body is equipped with a suitable fitting 12 adapted to be received in a holder 13 by which the cutter may be supported from a spindle to turn on its longitudinal axis 14 while being advanced axially to feed the tools into the work. A pilot pin 15 on the work fixture is received in a bushed recess 15a in the body 11 and serves to hold the cutter and work properly centered.

The blades 10 are mounted in the body for angular adjustment of the edges 5 and 6 about the longitudinal axes 10a of the blades which axes extend parallel to and are offset laterally from the rotational axis of the cutter. To this end, the body is drilled to form bores 16 that receive the blades with a close fit, the blades being of generally cylindrical contour and therefore firmly supported by the body substantially throughout their lengths. To provide for their angular adjustment, each blade is flattened on one side near its rear end to form laterally spaced surfaces 17 which are disposed eccentrically of the blade axis and bear against the ends of spaced set screws 18. The latter thread into holes that extend laterally from the blade recesses to the periphery of the body 11 where the screw heads are accessible.

The blades are backed by set screws 20 threading into the rear end of the body 11 with their ends bearing against the coned ends 21 of the blades. Provision is thus made for endwise adjustment of the blades to determine the extent of projection of the teeth 9 from the cutter body. Another screw 22 threading into the body transversely of the bore 16 may be provided for locking each blade in adjusted position.

With the mounting above described, the blades may be adjusted angularly to vary the radial position of the cutting edges 5 and 6 and thereby provide for milling of the work surfaces 2 and 3 to the precise diameters desired. After loosening the locking screw 22, the adjustment is effected by loosening one of the screws 18 and tightening the other. Since the screws act eccentrically on the blade, the latter is turned on its own axis 15, and the radial position of its cutting edge may be varied accurately within a limited range. After such adjustment the blade is again locked by its screw 22.

The improved blade mounting greatly facilitates the construction, setting and resharpening of hollow mills and the like particularly in the small sizes which heretofore have ordinarily been made with the teeth integral with the cutter body. Thus, the blades may be made separately out of round bar stock, ground to any tooth contour desired while supported in a separate fixture, and easily mounted in the body to produce a precise work dimension. The mounting is particularly advantageous where, as with the illustrated embodiment, both internal and external cutting edges are employed on the cutter.

I claim as my invention:

1. A cutter comprising a body adapted to be mounted for rotation about its longitudinal axis, said body having a plurality of axially opening bores offset laterally from and angularly spaced around said axis, cylindrical blades mounted respectively in said bores for rotary adjustment and being rotatable as a unit about said axis, the ends of said blades projecting from said body, a side cutting edge parallel to said body axis on one of said projecting blade ends for milling an internal work surface, a side cutting edge parallel to said body axis on another of said blade ends for simultaneously milling an external work surface, an end cutting edge on each of said blade ends for simultaneously milling a root surface between said internal and external surfaces, means on said body selectively operable to adjust said blades individually about their own axes incrementally into any selected angular position within a predetermined range without varying the effective cutting contour of said edges whereby to move their edges toward and away from said body axis to vary the diameters of the cutting circles of revolution of said side edges, and means for clamping said blades in position of adjustment.

2. A cutter comprising a body adapted to be mounted for rotation about its longitudinal axis, said body having an axially opening bore offset laterally from said axis, a cylindrical blade mounted in said bore for rotary adjustment and being revoluble about the bore axis, the end of said blade projecting from the end of said body, a cutting edge on said projecting blade and extending generally longitudinally of and offset laterally from the bore axis, and means carried by said body and selectively operable to adjust said blade angularly about its own axis incrementally into any position within a predetermined range whereby to vary the cutting position of said cutting edge relative to said body axis in accordance with the required radial depth of cut on the work surface.

3. A cutter comprising a body adapted to be mounted for rotation about its longitudinal axis, said body having an axially opening bore offset laterally from said axis, a cylindrical blade mounted in said bore for rotary adjustment and being revoluble about the bore axis, the end of said blade projecting from the end of said body, a cutting edge on said projecting blade end extending generally longitudinally of and offset laterally from the bore axis, means selectively operable to adjust said blade angularly about said axis, said means including circumferentially spaced surfaces on said blade within said bore, and two adjusting screws threaded laterally through said body into said bore in respective engagement with said surfaces at opposite sides of the blade axis, and means in addition to said screws for clamping said blade in adjusted position.

JOHN A. MARKSTRUM.